ис010876534B2

United States Patent
Davis et al.

(10) Patent No.: US 10,876,534 B2
(45) Date of Patent: Dec. 29, 2020

(54) COMBINED PUMP AND MOTOR WITH A STATOR FORMING A CAVITY WHICH HOUSES AN IMPELLER BETWEEN UPPER AND LOWER DIFFUSERS WITH THE IMPELLER HAVING A CIRCUMFERENTIAL MAGNET ARRAY EXTENDING UPWARD AND DOWNWARD INTO DIFFUSER ANNULAR CLEARANCES

(71) Applicant: Baker Hughes, a GE Company, LLC, Houston, TX (US)

(72) Inventors: Nikolas Davis, Broken Arrow, OK (US); Zheng Ye, Claremore, OK (US); Ameen Muhammed, Albany, NY (US); Carroll Dearman, Owasso, OK (US); Gary Williams, Broken Arrow, OK (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 217 days.

(21) Appl. No.: 15/934,569

(22) Filed: Mar. 23, 2018

(65) Prior Publication Data

US 2019/0040863 A1 Feb. 7, 2019

Related U.S. Application Data

(60) Provisional application No. 62/539,870, filed on Aug. 1, 2017.

(51) Int. Cl.
*F04D 13/06* (2006.01)
*F04D 29/44* (2006.01)
(Continued)

(52) U.S. Cl.
CPC ............... *F04D 13/06* (2013.01); *F04D 1/06* (2013.01); *F04D 13/08* (2013.01); *F04D 13/086* (2013.01);
(Continued)

(58) Field of Classification Search
CPC .... F04D 13/0633; F04D 13/064; F04D 13/08; F04D 13/06; F04D 13/0606;
(Continued)

(56) References Cited

U.S. PATENT DOCUMENTS 2,319,730 A * 5/1943 Garraway ................. F04D 1/06
417/356
3,276,382 A * 10/1966 Richter ..................... F04D 3/00
417/247

(Continued)

FOREIGN PATENT DOCUMENTS

CN 203978856 U 12/2014
GB 2499114 A 8/2013
(Continued)

OTHER PUBLICATIONS

International Search Report and Written Opinion dated Sep. 4, 2018 for corresponding PCT/US2018/034702.
(Continued)

*Primary Examiner* — Devon C Kramer
*Assistant Examiner* — Benjamin Doyle
(74) *Attorney, Agent, or Firm* — Bracewell LLP; James E. Bradley

(57) ABSTRACT

A combined pump and motor has a stator mounted for non-rotation in a housing. The stator has windings that create an electromagnetic field in the stator cavity when powered. An upper diffuser and a lower diffuser are mounted for non-rotation in the stator cavity. Annular clearances exist between the upper diffuser and the inner diameter of the (Continued)

stator and between the lower diffuser and the inner diameter of the stator. An impeller between the lower diffuser and the upper diffuser has an array of magnets circumferentially mounted around the impeller that impart rotation to the impeller in response to the electromagnetic field in the stator cavity. The array of magnets has at least one end portion extending into one of the upper and lower diffuser annular clearances.

10 Claims, 4 Drawing Sheets

(51) Int. Cl.
| | |
|---|---|
| *F04D 1/06* | (2006.01) |
| *F04D 13/10* | (2006.01) |
| *F04D 29/18* | (2006.01) |
| *F04D 29/40* | (2006.01) |
| *F04D 29/42* | (2006.01) |
| *F04D 25/06* | (2006.01) |
| *F04D 13/08* | (2006.01) |

(52) U.S. Cl.
CPC ......... *F04D 13/10* (2013.01); *F04D 25/0686* (2013.01); *F04D 29/181* (2013.01); *F04D 29/183* (2013.01); *F04D 29/406* (2013.01); *F04D 29/426* (2013.01); *F04D 29/44* (2013.01); *F04D 29/445* (2013.01)

(58) Field of Classification Search
CPC ........ F04D 13/0646; F04D 13/10; F04D 1/06; F04D 29/02; F04D 29/08; F04D 29/22; F04D 29/44; F04D 29/66; F05D 2240/126; F05D 2240/14; F05D 2240/52; H02K 1/278; H02K 5/124; H02K 5/132; H02K 3/345; H02K 5/1285; H02K 7/14
USPC ........................................................ 417/356
See application file for complete search history.

(56) References Cited

U.S. PATENT DOCUMENTS

| | | | | |
|---|---|---|---|---|
| 5,017,087 A | * | 5/1991 | Sneddon | ................. F01D 15/08 |
| | | | | 415/221 |
| 5,209,650 A | * | 5/1993 | Lemieux | ................. F01D 15/10 |
| | | | | 384/115 |
| 5,289,068 A | * | 2/1994 | Veronesi | ................. B63G 8/08 |
| | | | | 310/114 |
| 5,490,768 A | * | 2/1996 | Veronesi | ................. B63H 1/16 |
| | | | | 417/356 |
| 5,494,413 A | * | 2/1996 | Campen | ................. F04D 3/005 |
| | | | | 417/356 |
| 5,649,811 A | | 7/1997 | Krol et al. | |
| 5,713,727 A | | 2/1998 | Veronesi et al. | |
| 5,921,484 A | | 7/1999 | Smith et al. | |
| 6,056,518 A | | 5/2000 | Allen et al. | |
| 6,499,966 B1 | | 12/2002 | Werson et al. | |
| 6,554,584 B2 | | 4/2003 | Takura et al. | |
| 6,811,382 B2 | | 11/2004 | Buchanan et al. | |
| 6,837,757 B2 | * | 1/2005 | Van Dine | ............... B63H 23/24 |
| | | | | 310/87 |
| 7,021,905 B2 | * | 4/2006 | Torrey | ..................... F04C 2/18 |
| | | | | 290/52 |
| 8,454,330 B2 | * | 6/2013 | Lyngholm | ............... F04D 13/10 |
| | | | | 417/423.3 |
| 10,683,737 B2 | * | 6/2020 | Martinez | ................. F04D 13/12 |
| 2003/0161739 A1 | * | 8/2003 | Chu | ..................... F04D 13/0646 |
| | | | | 417/356 |
| 2006/0056992 A1 | | 3/2006 | Sadler et al. | |
| 2012/0063934 A1 | | 3/2012 | Rumbaugh et al. | |
| 2013/0236341 A1 | * | 9/2013 | Andersen | ............... F04D 13/10 |
| | | | | 417/420 |
| 2014/0079575 A1 | | 3/2014 | Forsberg | |
| 2014/0112808 A1 | * | 4/2014 | Moore | ................. F04D 13/0606 |
| | | | | 417/423.7 |
| 2015/0132159 A1 | | 5/2015 | Wilson et al. | |
| 2015/0167686 A1 | * | 6/2015 | Baillargeon | .......... F04D 29/445 |
| | | | | 415/111 |
| 2016/0090992 A1 | | 3/2016 | Jayaram et al. | |
| 2018/0223854 A1 | * | 8/2018 | Brunvold | ............... F04D 19/024 |
| 2019/0271217 A1 | * | 9/2019 | Radov | ..................... F04D 31/00 |

FOREIGN PATENT DOCUMENTS

| | | |
|---|---|---|
| WO | 2017021553 A1 | 2/2017 |
| WO | 2018022198 A1 | 2/2018 |

OTHER PUBLICATIONS

International Search Report dated and Written Opinion dated Sep. 14, 2018 for corresponding PCT/US2018/034641.

* cited by examiner

US 10,876,534 B2

COMBINED PUMP AND MOTOR WITH A STATOR FORMING A CAVITY WHICH HOUSES AN IMPELLER BETWEEN UPPER AND LOWER DIFFUSERS WITH THE IMPELLER HAVING A CIRCUMFERENTIAL MAGNET ARRAY EXTENDING UPWARD AND DOWNWARD INTO DIFFUSER ANNULAR CLEARANCES

CROSS-REFERENCE TO RELATED APPLICATION

This application claims priority to provisional application Ser. No. 62/539,870, filed Aug. 1, 2017.

FIELD OF INVENTION

The present disclosure relates to downhole pumping systems for well bore fluids, particularly to a centrifugal pump with permanent magnets mounted to the impellers that cause the impellers to rotate in response to electromagnetic fields emanating from a surrounding stator. The impellers are located between spaced apart diffusers, placing the magnets next to the stator inner diameter of the stator.

BACKGROUND

Electrical submersible pumps (ESP) are commonly used in hydrocarbon producing wells. A typical ESP includes an electrical motor having a rotating drive shaft that drives the pump. The pump is often a centrifugal pump having a large number of stages. Each stage has a nonrotating diffuser and a rotating impeller. The motor has a drive shaft that couples to the pump shaft to rotate the impellers. The motor may have lengths up to 30 feet or more. Radial motor bearings support the motor shaft along the lengths. A dielectric fluid in the motor lubricates the motor bearings. A pressure equalizer mounts to the motor to reduce a pressure difference between the dielectric lubricant in the motor and the well fluid on the exterior. A shaft seal, usually at an end of the pressure equalizer, seals around the drive shaft to prevent the entry of well fluids into the motor lubricant.

In some cases, pumps are mounted in tandem and motors are mounted in tandem, creating a lengthy assembly. A workover rig is often required to install and retrieve the assembly. The motor relies on well fluid flowing past to cool the motor. Consequently, some arrangements must be made to achieve well fluid flow past the motor. For example, the motor may be positioned above the casing perforations or within a shroud surrounding the motor. Alternately, a small tube may extend alongside the motor from the pump to below the motor to divert a portion of the well fluid being pumped by the pump.

While very successful, ESP's have many parts, adding cost and reliability issues. The shaft seal creates a leakage path for well fluid, which can cause motor failure. The long length can create problems while installing the pump within curved sections of a deviated well.

SUMMARY

A combined pump and motor apparatus has a housing having an axis. A stator is mounted for non-rotation in the housing. The stator has a stator cavity with an inner diameter coaxial with the axis. The stator has windings that create an electromagnetic field in the stator cavity when powered. An upper and a lower diffuser are mounted for non-rotation in the stator cavity, each of the diffusers having diffuser passages. Each of the diffusers has an outer wall portion coaxial with the axis that defines a maximum outer diameter of each of the diffusers. The outer wall portion of the lower diffuser is spaced an axial distance below the outer wall portion of the upper diffuser, defining an axial gap in the stator cavity between the outer wall portions. An impeller is rotatably mounted between the upper and lower diffusers, the impeller having impeller passages. An array of magnets extends circumferentially around the impeller radially outward from the impeller passages. The array of magnets imparts rotation to the impeller in response to the electromagnetic field in the stator cavity. The array of magnets is located in the axial gap between the outer wall portions of the upper and lower diffuser.

The array of magnets circumscribes an outer diameter that is at least equal to the outer diameter of the outer wall portions of the upper and lower diffusers. In the embodiments shown, the array of magnets circumscribes an outer diameter that is the same as the outer diameters of the outer wall portions of the upper and lower diffusers. The array of magnets has an axial length that is greater than an axial distance from an impeller inlet to an impeller outlet of the impeller passages.

At least one of the diffusers has a reduced diameter portion joining its outer wall portion. The reduced diameter portion has a cylindrical outer surface of lesser diameter than the outer diameter of the outer wall portion and spaced radially inward from the inner diameter of the stator cavity. The reduced diameter portion defines an annular clearance between the reduced diameter portion and the inner diameter of the stator cavity. An end portion of the array of magnets is located in the annular clearance.

In the embodiments shown, each of the diffusers has a reduced diameter portion joining the outer wall portion of each of the diffusers. Each of the reduced diameter portions has a cylindrical outer surface of lesser diameter than each of the outer wall portions and spaced radially inward from the inner diameter of the stator cavity. The reduced diameter portions define upper and lower annular clearances between the reduced diameter portions and the inner diameter of the stator cavity. A lower end portion of the array of magnets is located in the upper annular clearance of the lower diffuser, and an upper end portion of the array of magnets is located in the lower annular clearance of the upper diffuser.

In one embodiment, a non-rotatable central support extending coaxially between the upper and lower diffusers and fixes the axial gap between the outer wall portions of the upper and lower diffusers. The impeller has a central passage through which the central support extends. A down thrust bearing in the central passage between the impeller and the central support transfers down thrust created by the impeller to the lower diffuser.

In a second embodiment, the impeller comprises an upper impeller and the apparatus further comprises a lower impeller below the lower diffuser. There are central passages in the upper and lower diffusers and in the upper and lower impellers. A rotatable shaft extends through the central passages in the upper and lower diffusers and in the upper and lower impellers. The upper and lower impellers secure to the shaft for causing the shaft to rotate with the upper and lower impellers.

In the second embodiment, an axially extending slot and key arrangement is configured between the inner diameter of the stator cavity and the outer wall portions of the upper and lower diffusers. The slot and key arrangement prevents rotation of the upper and lower diffusers within the stator cavity.

Figure 1:
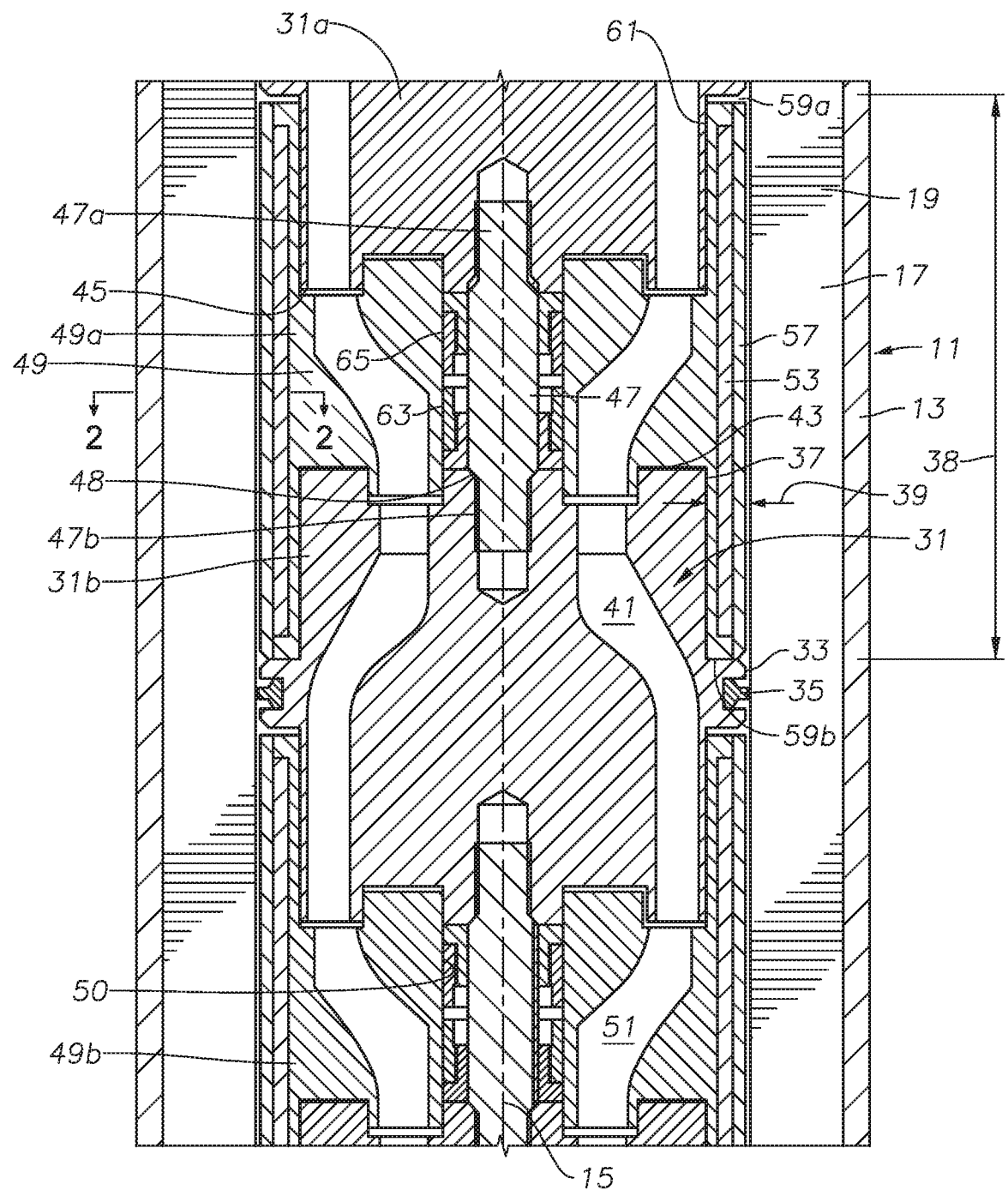
FIG. 1 is a sectional view of portions of a combined pump and motor in accordance with this disclosure.

While the disclosure will be described in connection with the preferred embodiments, it will be understood that it is not intended to limit the disclosure to those embodiments. On the contrary, it is intended to cover all alternatives, modifications, and equivalents, as may be included within the scope of the claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Portions of a combined pump and motor 11 are shown in FIG. 1. Pump and motor 11 has a cylindrical housing 13 with a longitudinal axis 15. A stator 17 is mounted for non-rotation in housing 13. In this embodiment, stator 17 closely fits within the inner diameter of housing 13. Stator 17 is made up of a large number of thin, discs or laminations 19 stacked together. At least some of the stator discs 19 stacked together are of a magnetic material, such as a type of a steel alloy. Optionally, some of the magnetic stator discs 19 may be spaced apart from each other by discs formed of a nonmagnetic material, such as nonmagnetic stainless steel or bronze alloy. All of stator discs 19 are the same, other than some of the discs optionally being nonmagnetic.

Figure 2:
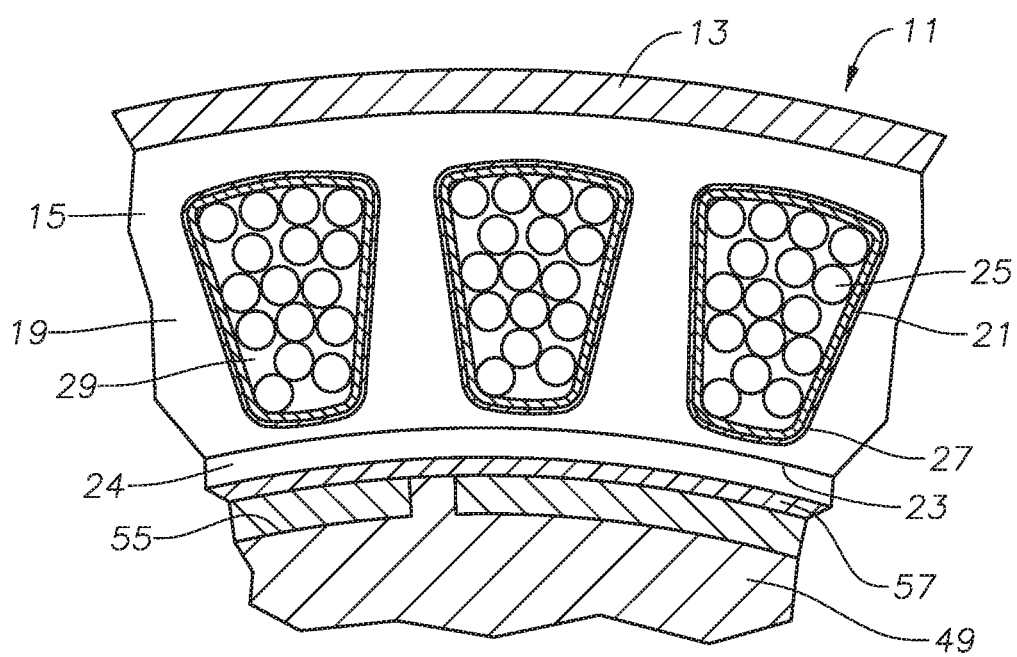
FIG. 2 is a sectional view of part of the pump and motor of FIG. 1, taken along the line 2-2 of FIG. 1.

Referring to FIG. 2, each disc 19 has apertures or slots 21 spaced circumferentially apart from each other around a large central opening which makes up a stator inner wall or inner diameter 23 of a stator cavity 24 within stator 17. Optionally, parts of the inner edges of slots 23 could join central stator inner wall 23. Slots 21 of discs 19 are axially aligned with each other in axially extending rows. Motor windings 25, which are insulated conductors, wind through the various slots 21 generally parallel with axis 15 (FIG. 1). Each row of axially aligned slots 21 optionally may have a thermoplastic liner 27 through which windings 25 extend. Also, windings 25 may optionally be imbedded in a bonding material, such as epoxy 29, which is injected into liners 27 after windings 25 have been wound through slots 21.

Windings 25 extend continuously through slots 21 from the upper end to the lower end of stator 17. Windings 25 in one axial row of slots 21 pass from the lower end into another axial row of slots 21 in a selected pattern. A winding 25 for each phase extends from one end of stator 17, such as the upper end, for receiving AC current. When supplied with three phase AC power, windings 25 create electromagnetic fields directed inward into stator cavity 24 toward axis 15. The terms "upper", "lower" and the like are used for convenience only because the combined pump and motor 11 (FIG. 1) may be used in various inclinations, including horizontal, as well as inverted.

Referring again to FIG. 1, stator inner wall 23 has a constant inner diameter. A thin nonmagnetic container or can (not shown) optionally may enclose stator 17, including its inner wall 23 and windings 25, to prevent well fluid in stator cavity 24 from contact with stator discs 19 and windings 25 (FIG. 2). Also, epoxy 29 (FIG. 2) in slots 21, if used, seals windings 25 from contact with well fluid within stator cavity 24 if a stator can is not employed.

Diffusers 31 are mounted in stator central cavity 24 for non-rotation. In this embodiment, only two diffusers 31 are shown, one of which is referred to as upper diffuser 31a and the other as lower diffuser 31b. In practice, many more would be used. Each diffuser 31 is identical and may be made from a nonmagnetic material, such as a nickel alloy. Each diffuser 31 has an annular outer wall portion, band or rib 33 that fits closely within stator inner wall 23. Diffuser rib 33 has a cylindrical exterior or outer wall that defines the outermost portion or the maximum outer diameter of each diffuser 31. In this example, a diffuser seal ring 35 in an annular groove on the outer wall of rib 33 seals each diffuser rib 33 to stator inner wall 23.

Each diffuser 31 has a reduced outer diameter cylindrical portion 37 that faces stator inner wall 23 and is spaced from stator inner wall 23 by an annular clearance 39. Rib 33 protrudes radially outward from the reduced diameter cylindrical portion 37 and has a larger outer diameter than reduced diameter cylindrical portion 37. Rib 33 divides annular clearance 39 into an upper portion, which has an open upper end and a lower portion, which has an open lower end. The upper and lower portions of annular clearance 39 may have the same axial length, as shown. An axial gap or distance 38 extends from the lower side of rib 33 of upper diffuser 31a to the upper side of rib 33 of lower diffuser 31b.

Each diffuser 31 has conventional diffuser passages 41 that lead from an intake area on the lower side to an outlet area on the upper side. The diffuser passages 41 shown are of a mixed flow type that lead upward and inward. However, diffusers 31 could alternately be a radial flow type with passages 41 that lead primarily inward from the intake area to the outlet area.

Diffusers 31 are axially spaced apart from each other. Lower diffuser 31b has an uppermost end 43 spaced an axial distance below a lowermost end 45 of upper diffuser 31a. The uppermost end 43 of lower diffuser 31b is axially above rib 33 on lower diffuser 31b. Lowermost end 45 is axially below rib 33 on upper diffuser 31a. In this embodiment, a central support 47 rigidly connects upper diffuser 31a with lower diffuser 31b, fixing the length of axial gap 38. Central support 47 could have a variety of configurations including having portions integral with diffusers 31. In this example, central support 47 comprises a rod or non-rotating shaft with an externally threaded upper end 47a secured in a threaded hole in lower end 45 of upper diffuser 31a. Central support 47 has an externally threaded lower end 47b secured in a threaded hole in upper end 45 of lower diffuser 31b. Central support 47 has a downward facing shoulder 48, which may be conical, at the upper end of the threads on threaded lower end 47b. Shoulder 48 engages a mating a shoulder on the upper end of lower diffuser 31b. A similar shoulder is on the lower end of the threads of threaded upper end 47a for engaging a mating shoulder on the lower end of upper diffuser 31a.

A rotatable impeller 49 mounts between each diffuser 31 and has a central passage 50 through which central support 47 extends. Impellers 49 may be identical. Each impeller 49 can be made from a magnetic material, such as a type of a stainless steel. Alternately, they could be formed of a non-magnetic material, such as a nickel alloy. Only two of the impellers 49 are shown, with the one located between upper and lower diffusers 31a, 31b referred to as upper impeller 49a. The impeller 49 directly below lower diffuser 31b is referred to as lower impeller 49b. Each impeller 49 has impeller passages 51 that spiral and extend from a central or common inlet on the lower side upward and outward to a discharge area on the upper side.

An array of permanent magnets 53 is mounted to and extends circumferentially around each impeller 49. In this embodiment, magnets 53 are not located in impeller passages 51; rather, the array of magnets 53 is radially farther from axis 15 than impeller passages 51. In this example, each magnet 53 is bonded into a slot or pocket 55 (FIG. 2) formed in an outer wall of impeller 49. The array of magnets 53 may include a thin, retaining sleeve 57 surrounding magnets 53, separating magnets 53 from stator inner wall 23 by a small clearance. Retaining sleeve 57, which is considered to be a part of the array of magnets 53, has an outer diameter that is at least equal to the outer diameter of diffuser rib 33. In this example, the outer diameters of diffuser rib 33 and retaining sleeve 57 are the same.

In this embodiment, the array of magnets 53 of each impellers 49 has an axial length greater than the axial distance from the intake of impeller passages 51 to the outlet of impeller passage 51. Further, the axial length of the array of magnets 53 is greater than the axial distance between upper diffuser lower end 43 and lower diffuser upper end 45. In this example, the greater length is accommodated by positioning an upper end portion 59a of the array of magnets 53 within the portion of annular clearance 39 below rib 33 of upper diffuser 31a. A lower end portion 59b may be positioned within annular clearance 39 above rib 33 of lower diffuser 31b. The upper end of upper end portion 59a may be closely spaced to the lower side of rib 33 of upper diffuser 31a. The lower end of lower end portion 59b may be closely spaced to the upper side of rib 33 of lower diffuser 31b. Upper end portion 59a comprises a thin cylindrical wall 61 with an inner diameter closely spaced to or in sliding relationship with diffuser reduced diameter portion 37 on upper diffuser 31a. Lower end portion 59b may also comprise a thin cylindrical wall an inner diameter closely spaced to diffuser reduced diameter portion 37 on lower diffuser 31b.

The axial dimension of rib 33 from its upper to its lower side is much less than the axial length of the array of magnets 53. Magnets 53 have a length only slightly less than axial gap 38. The length of the array of magnets 53 is made up of the length of upper end portion 59a, lower end portion 59b and an intermediate portion between upper and lower end portions 59a, 59b.

As mentioned above, some of the stator discs 19 could be non-magnetic. If employed, those non-magnetic discs 19 would be located radially outward from each diffuser rib 33. The magnetic discs 19 would be located radially outward from each array of magnets 53.

Impellers 49 rotate relative to central supports 47 while pumping well fluid. In addition, impellers 49 create down thrust during operation, and at times may create up thrust. Various arrangements may be made to transfer the thrust created eventually to housing 13. In this embodiment, a down thrust bearing 63 in impeller central passage 50 transfers the down thrust from upper impeller 49a to lower diffuser 31b. Similarly, an up thrust bearing 65 in impeller central passage 50 transfers the up thrust from upper impeller 49a to upper diffuser 31a. Central supports 47 transfer the thrust imposed on one diffuser 31 to the next. The lowermost diffuser 31 (not shown) will be connected by various means to housing 13 to transfer the cumulative down thrust from all of the diffusers 31 to housing 13. The uppermost diffuser 31 (not shown) will be also connected to housing 13 to transfer the cumulative up thrust on all of the diffusers 31 to housing 13.

Figure 3:
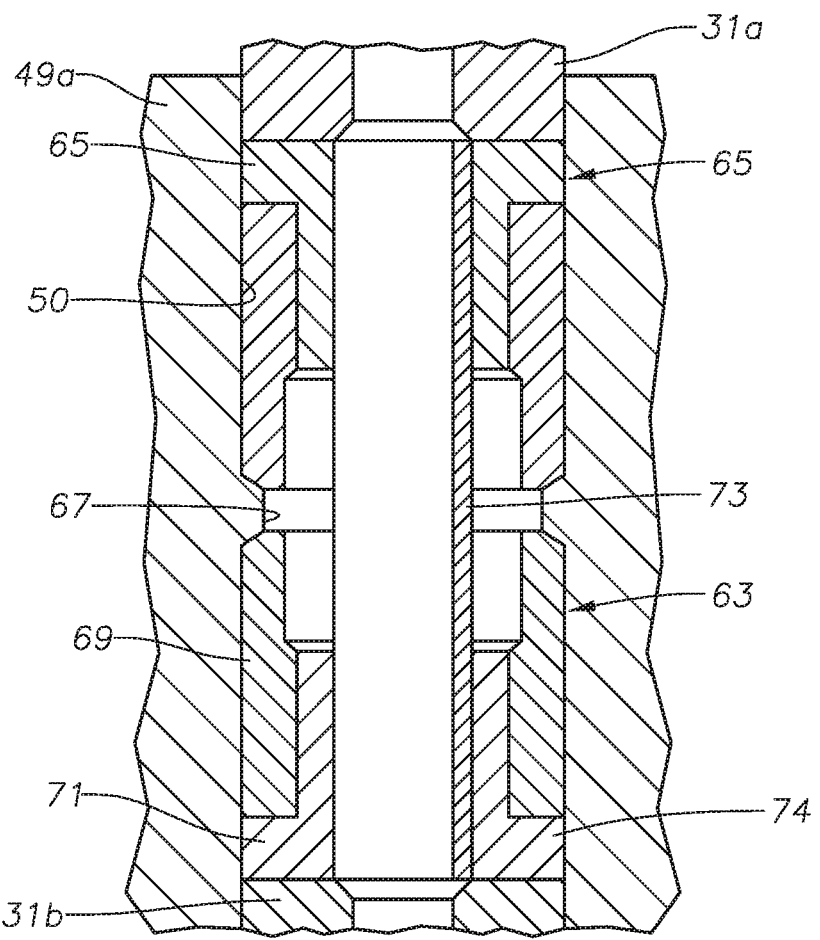
FIG. 3 is an enlarged sectional view of the thrust bearings in the upper impeller of FIG. 2.

Down thrust bearing 63 may be identical to up thrust bearing 65, but inverted. Various configurations of down thrust bearing 63 and up thrust bearing 65 are feasible. Referring to FIG. 3, in this example, each impeller 49 has an annular band 67 within its central passage 50. Annular band 67 protrudes radially inward a short distance within central passage 50. Each bearing 63, 65 has a sleeve 69 that rotates with impeller 49 and has an end that abuts band 67. The lower end of sleeve 69 of up thrust bearing 65 abuts the upper side of band 67. The lower end of sleeve 69 of down thrust bearing 63 abuts the lower side of band 67.

Each bearing 63, 65 has a bushing 71 that is affixed to central support 47 so as to be non-rotatable. For example, a key and slot arrangement 73 may be employed to prevent bushing 71 from rotating. The inner diameter of bushing 71 is in sliding rotational engagement with the outer diameter of sleeve 69. Bushing 71 has an external flange 74 in contact with the adjacent diffuser 31. An end of sleeve 69 is in rotating sliding engagement with flange 74 to transfer thrust from impeller 49 to flange 74 and the adjacent diffuser 31. Band 67 transfers down thrust from impeller 49 to bushing 71 of down thrust bearing 63 and up thrust from impeller 49 to bushing 71 of up thrust bearing 65.

Figure 4:
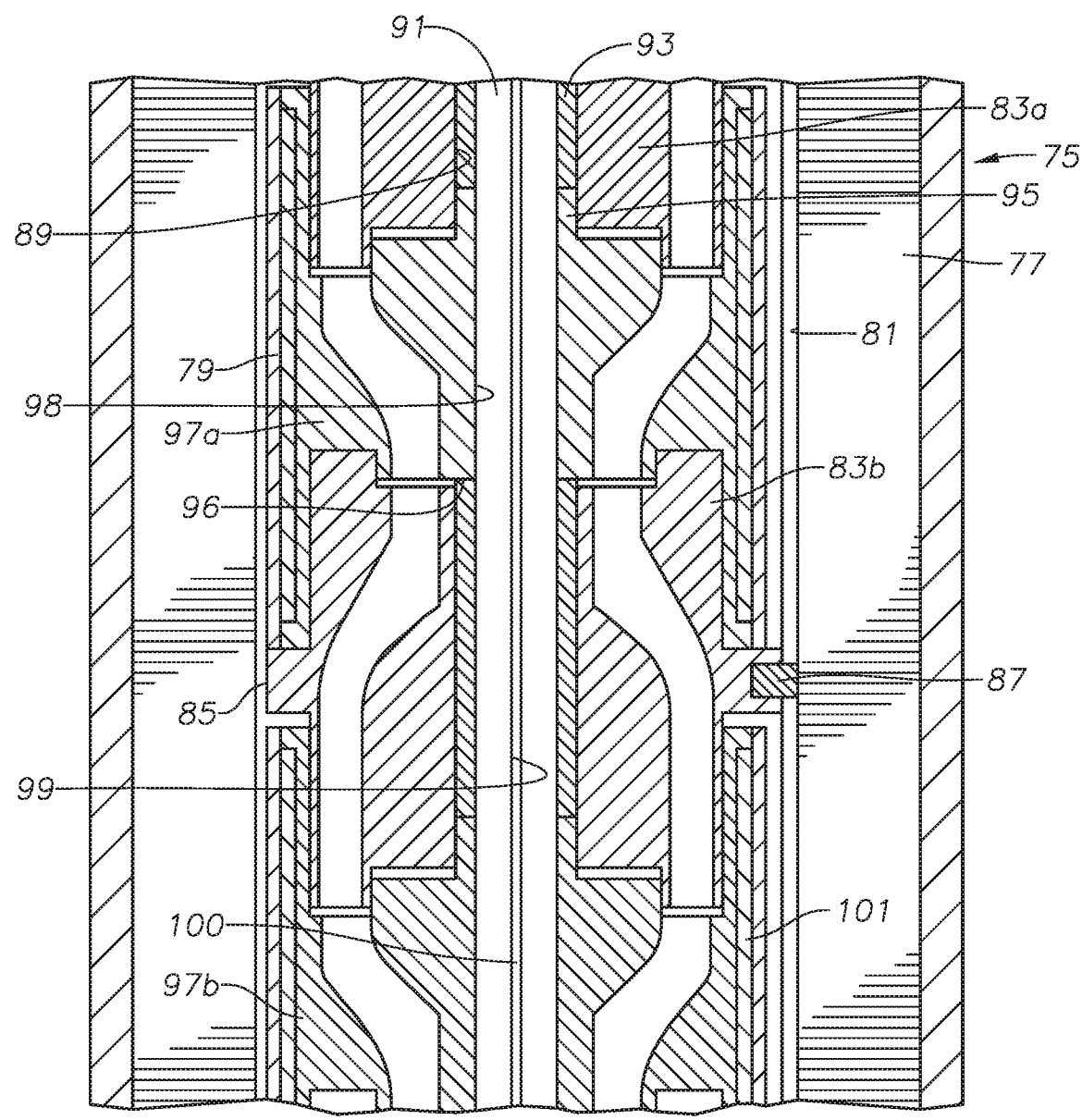
FIG. 4 is a sectional view of portions of an alternate embodiment of a combined pump and motor.

FIG. 4 shows an alternate embodiment that has may components identical to the first embodiment, thus require no further discussion. Combined pump and motor 75 has a stator 77 that may be the same as stator 17 (FIG. 1), except that stator cavity inner wall 79 has a key and slot arrangement. In this example, the key and slot arrangement comprises an axially extending slot 81 formed in stator inner wall 79. Each diffuser 83a, 83b has an annular rib 85 closely spaced to stator inner wall 79. A key or pin 87 secures to rib 85 and protrudes into slot 81 to prevent rotation of diffuser 83a, 83b relative to stator 77. In this example, there is no seal ring, such as seal ring 35 (FIG. 1) between ribs 85 and stator inner wall 79. Rather any sealing arrangements (not shown) will be at the upper and lower ends of stator 77.

In the FIG. 4 embodiment, each diffuser 83a, 83b has a central passage 89 extending coaxially through it from its lower end to its upper end. A rotatable shaft 91 extends through diffuser central passages 89. Spacer tubes 93 that rotate with shaft 91 may surround shaft 91 within central passages 89 of diffusers 83a, 83b.

Upper and lower impellers 97a, 97b have central passages 98 through which shaft 91 extends. Each spacer tube 93 has a lower end that contacts an upper end 95 of lower impeller 97b. The upper end of spacer tube 93 contacts a lower end 96 of the lower impeller 97b. One or both of the upper and lower ends 95, 96 could comprises a cylindrical hub. Spacer tubes 93 transfer down thrust and up thrust between impellers 97a, 97b. Thrust bearings (not shown) at the upper and lower ends of stator 77 transfer the cumulative thrust to the housing of combined pump and motor 77. In this example, thrust from impellers 97a, 97b does not transfer to diffusers 83a, 93b, which are free to float small axial increments relative to stator 77.

Shaft 91 and the central passages 98 in impellers 97a, 97b have a key and slot arrangement that causes shaft 91 to rotate in unison with impellers 97a, 97b. The key and slot arrangement also causes the impellers 97a, 97b to be rotatably locked together for rotation in unison. The key and slot arrangement may comprise an axially extending slot 99 on the exterior of shaft 91 and mating keys 100 in impellers 97a, 97b and spacer tubes 93.

Each impellers 97a, 97b has an array of magnets 101 as in the first embodiment that extend into annular clearances above and below diffuser ribs 85. The magnetic field created by the windings in stator 77 interacts with magnets 101 to impart rotation to impellers 97a, 97b.

Figure 5:
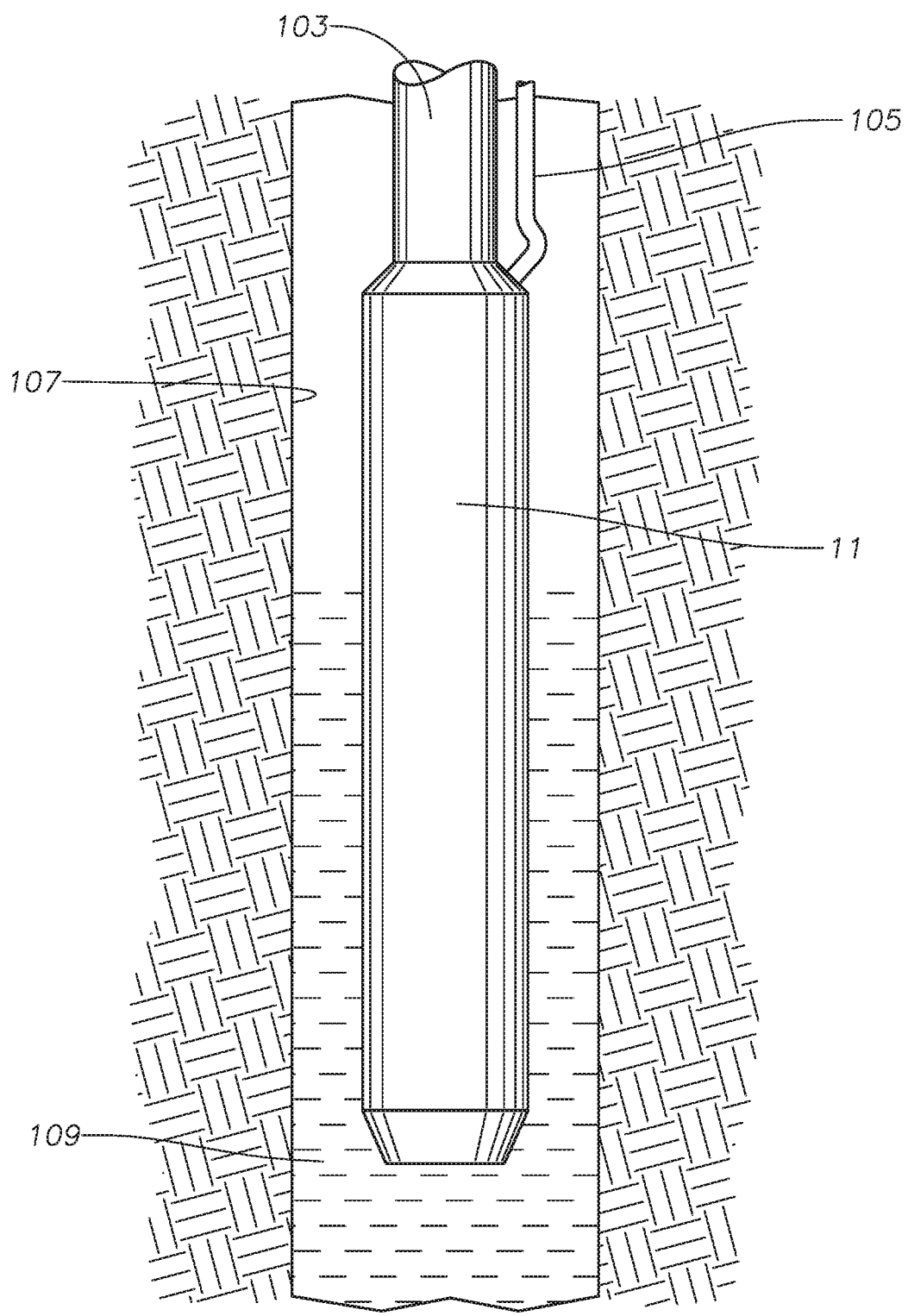
FIG. 5 is a schematic view of the pump and motor of FIG. 1 installed within a well.

Referring to FIG. 5, in use, combined pump and motor 11 may be secured to a string of production tubing 103 extending to a wellhead assembly (not shown) at the surface. A power cable 105 extends downward from the wellhead alongside production tubing 103 to combined pump and motor 11 for supplying AC three phase power. Production tubing 103 supports pump and motor 11 within casing 107 containing a well fluid 109. Other installation arrangements may be employed, such as supporting combined pump and motor 11 on coiled tubing that contains power cable 105. In that instance, the discharge of combined pump and motor 11 would be into casing 107 or a liner within casing 107. Pump and motor 11 may be suspended above or below perforations (not shown) in casing 107.

In operation, three-phase AC electrical power supplied to windings 27 (FIG. 2) creates electromagnetic fields into stator cavity 24. The electromagnetic fields affect magnets 53 (FIG. 1) to cause impellers 49 to rotate. Well fluid 109 (FIG. 5) flows through an intake at the lower end of pump and motor 11 into the impeller inlet of the lowest impeller 49. Impeller 49 discharges the well fluid from impeller passages 51 into diffuser passages 41 of the next upward diffuser 31. Each stage of impeller 49 and diffuser 31 increases the pressure of the well fluid in the same manner as a centrifugal pump.

The present disclosure described herein, therefore, is well adapted to carry out the objects and attain the ends and advantages mentioned, as well as others inherent therein. The combined pump and motor has a shorter length than a prior art ESP with the same number of pump stages. The combined pump and motor has fewer components than a prior art ESP. A rotating shaft extending from a motor to a pump is not needed, eliminating a well fluid leakage path through a shaft seal. A pressure equalizer is not needed. Cooling occurs due to the well fluid flowing up the interior of the combined pump and motor. If the combined pump and motor is suspended above the perforations, cooling fluid along the exterior of the motor may not be needed. If the combined pump and motor is suspended below the perforations, the well fluid flowing downward past the housing to the intake at the lower end of the combined pump and motor also provides cooling. There are other advantages, as well.

While a few preferred embodiments of the disclosure have been given for purposes of disclosure, numerous changes exist in the details of procedures for accomplishing the desired results. These and other similar modifications will readily suggest themselves to those skilled in the art, and are intended to be encompassed within the scope of the appended claims.

The invention claimed is:

1. A combined pump and motor apparatus, comprising:
  a housing having an axis;
  a stator mounted for non-rotation in the housing, the stator having a stator cavity with an inner diameter coaxial with the axis, the stator having windings that create an electromagnetic field in the stator cavity when powered;
  an upper and a lower diffuser, each mounted for non-rotation in the stator cavity, each of the upper and lower diffusers having diffuser passages;
  an annular external rib protruding radially from an outer diameter cylindrical portion of each of the upper diffuser annular external rib and the lower diffuser annular external rib having an outer diameter closely spaced to and inward from the inner diameter of the stator cavity;
  an upper diffuser annular clearance between the outer diameter cylindrical portion of each of the upper and lower diffusers and the inner diameter of the stator cavity, each upper diffuser annular clearance extending from each annular external rib to an upper end of each of the upper and lower diffusers;
  a lower diffuser annular clearance between the outer diameter cylindrical portion of each of the upper and lower diffusers and the inner diameter of the stator cavity, each lower diffuser annular clearance extending from each annular external rib to a lower end of each of the upper and lower diffusers;
  a seal ring on the outer diameter of each annular external rib that seals between each annular external rib and the inner diameter of the stator cavity;
  an impeller between the lower diffuser and the upper diffuser, the impeller having impeller passages;
  an array of magnets circumferentially mounted around the impeller radially outward from the impeller passages, the array of magnets imparting rotation to the impeller in response to the electromagnetic field in the stator cavity;
  the array of magnets having an upper end portion extending upward into the lower diffuser annular clearance of the upper diffuser; and the array of magnets having a lower end portion extending downward into the upper diffuser annular clearance of the lower diffuser.

2. The apparatus according to claim 1, wherein the outer diameter of each annular external rib is greater than an outer diameter of the array of magnets.

3. The apparatus according to claim 1, further comprising:
  a retaining sleeve surrounding the array of magnets, the retaining sleeve having an upper end closely spaced to the annular external rib on the upper diffuser and a lower end closely spaced to the annular external rib on the lower diffuser; and wherein the retaining sleeve has an outer diameter at least equal to the outer diameter of the annular external rib of each of the diffusers.

4. The apparatus according to claim 1, wherein:
  an axial length from the annular external rib of the upper diffuser to the upper end of the upper diffuser is the same as an axial length from the annular external rib of the upper diffuser to the lower end of the upper diffuser; and an axial length from the annular external rib of the lower diffuser to the upper end of the lower diffuser is the same as an axial length from the annular external rib of the lower diffuser to the lower end of the lower diffuser.

5. A combined pump and motor apparatus, comprising:
a housing having an axis;
a stator mounted for non-rotation in the housing, the stator having a stator cavity with an inner diameter coaxial with the axis, the stator having windings that create an electromagnetic field in the stator cavity when powered;
upper and lower diffusers, each mounted for non-rotation in the stator cavity, each of the diffusers having diffuser passages, each of the diffusers having an outer wall portion spaced radially inward from the inner diameter of the stator, defining upper and lower diffuser annular clearances;
an impeller rotatably mounted between the upper and lower diffusers and having impeller passages and a central passage;
an array of magnets mounted circumferentially around the impeller radially outward from the impeller passages, the array of magnets imparting rotation to the impeller in response to the electromagnetic field in the stator cavity;
the array of magnets having an upper end that extends upward into the annular clearance of the upper diffuser, the array of magnets having a lower end that extends downward into the annular clearance of the lower diffuser;
up thrust and down thrust bearings in the central passage of the impeller for transferring up thrust and down thrust created by the impeller to the upper diffuser and to the lower diffuser, respectively; and
a non-rotatable central support extending through the central passage;
means for securing an upper end of the central support to the upper diffuser and a lower end of the central support to the lower diffuser, for transferring up thrust imposed on the lower diffuser through the central support to the upper diffuser, and for transferring down thrust imposed on the upper diffuser through the central support to the lower diffuser.

6. The apparatus according to claim 5, wherein the means for securing comprises:
the upper and lower diffusers having threaded receptacles, threads on the upper and lower ends of the central support that engage mating threads in receptacles in the upper and lower diffusers respectively; and
a downward facing shoulder on the central support that abuts the lower diffuser.

7. The apparatus according to claim 6, wherein:
the shoulder comprises a conical surface.

8. The apparatus according to claim 5, further comprising:
an annular external rib on each of the upper and lower diffusers, separating each of the upper and lower diffuser annular clearances into upper and lower portions, each of the annular external ribs having an outer diameter closely spaced to and inward from the inner diameter of the stator cavity; and
a seal ring on the outer diameter of each of the annular external ribs that seals between each of the annular external ribs and the inner diameter of the stator cavity.

9. The apparatus according to claim 8, wherein the upper and lower portions of each of the diffuser annular clearances have the same axial length.

10. A combined pump and motor apparatus, comprising:
a housing having an axis;
a stator mounted for non-rotation in the housing, the stator having a stator cavity with an inner diameter coaxial with the axis, the stator having windings that create an electromagnetic field in the stator cavity when powered;
first, second and third diffusers, each mounted for non-rotation in the stator cavity, each of the diffusers having diffuser passages, each of the diffusers having an outer wall portion spaced radially inward from the inner diameter of the stator, defining an annular clearance;
a first impeller rotatably mounted between the first and second diffusers, and a second impeller rotatably mounted between the second and third diffusers, each of the impellers having impeller passages and central passages;
an array of magnets mounted circumferentially around each of the impellers radially outward from the impeller passages, the arrays of magnets imparting rotation to the impellers in response to the electromagnetic field in the stator cavity;
the array of magnets of the first impeller having an upper end that extends upward into the annular clearance of the first diffuser and a lower end that extends downward into the annular clearance of the second diffuser;
the of magnets of the second impeller having an upper end that extends upward into the annular clearance of the second diffuser and a lower end that extends downward into the annular clearance of the third diffuser;
up thrust and down thrust bearings in a central passage of the first impeller for transferring up thrust and down thrust created by the first impeller to the first diffuser and to the second diffuser, respectively;
up thrust and down thrust bearings in a central passage of the second impeller for transferring up thrust and down thrust created by the second impeller to the second diffuser and to the third diffuser, respectively;
a non-rotatable first central support extending through the central passage in the first impeller, the first central support having an upper end secured to the first diffuser and a lower end rigidly secured to the second diffuser, the first central support having a downward facing shoulder that abuts an upper portion of the second diffuser for transferring down thrust imposed on the first diffuser to the second diffuser and an upward facing shoulder that abuts a lower portion of the first diffuser for transferring up thrust imposed on the second diffuser to the first diffuser; and
a non-rotatable second central support extending through the central passage in the second impeller, the second central support having an upper end secured to the second diffuser and a lower end rigidly secured to the third diffuser, the second central support having a downward facing shoulder that abuts an upper portion of the third diffuser for transferring down thrust imposed on the second diffuser to the third diffuser and an upward facing shoulder that abuts an upper portion of the second diffuser for transferring up thrust imposed on the third diffuser to the second diffuser.

* * * * *